United States Patent
Anzai et al.

(10) Patent No.: US 12,417,280 B2
(45) Date of Patent: Sep. 16, 2025

(54) VEHICLE CONTROL SYSTEM AND METHOD FOR CONTROLLING VEHICLE CONTROL SYSTEM

(71) Applicant: Panasonic Intellectual Property Management Co., Ltd., Osaka (JP)

(72) Inventors: Jun Anzai, Kanagawa (JP); Toshihisa Nakano, Osaka (JP); Kento Tamura, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 174 days.

(21) Appl. No.: 18/228,822

(22) Filed: Aug. 1, 2023

(65) Prior Publication Data
US 2023/0376588 A1 Nov. 23, 2023

Related U.S. Application Data

(63) Continuation of application No. PCT/JP2021/045969, filed on Dec. 14, 2021.

(30) Foreign Application Priority Data

Feb. 8, 2021 (JP) ................. 2021-018087

(51) Int. Cl.
*G06F 21/55* (2013.01)
*B60W 60/00* (2020.01)
*G06F 21/00* (2013.01)

(52) U.S. Cl.
CPC ....... *G06F 21/55* (2013.01); *B60W 60/00188* (2020.02)

(58) Field of Classification Search
CPC .. B60W 60/00188; G06F 21/55; G06F 21/50; G06F 21/554; G06F 21/56; G06F 21/566; G06F 21/568; G06F 21/57; G06F 21/577
See application file for complete search history.

(56) References Cited

U.S. PATENT DOCUMENTS

| 2003/0172288 A1 | 9/2003 | Sasage |
| 2010/0043073 A1 | 2/2010 | Kuwamura |

(Continued)

FOREIGN PATENT DOCUMENTS

| JP | 2004-021549 | 1/2004 |
| JP | 4256107 | 4/2009 |

(Continued)

OTHER PUBLICATIONS

Office Action from Japan Patent Office (JPO) in Japanese Patent Appl. No. 2022-579377, dated Sep. 10, 2024, together with an English language translation.

(Continued)

*Primary Examiner* — Edward Zee
(74) *Attorney, Agent, or Firm* — Greenblum and Bernstein, P.L.C.

(57) ABSTRACT

A vehicle control system includes: a detector that detects an attack on an application; a vehicle state verifier that verifies a state of a vehicle when the detector detects the attack; an influence verifier that verifies, based on a verification result of the vehicle state verifier, an influence on the vehicle assuming operation of the application subjected to the attack is stopped; a determiner that determines, based on a verification result of the influence verifier, at least one of a response method for responding to the attack or a recovery method for recovering the application subjected to the attack; and a controller that executes at least one of the response method or the recovery method determined.

7 Claims, 5 Drawing Sheets

(56) References Cited

U.S. PATENT DOCUMENTS

| | | |
|---|---|---|
| 2014/0032559 A1 | 1/2014 | Wang et al. |
| 2015/0271201 A1* | 9/2015 | Ruvio ............... H04L 67/12 726/23 |
| 2021/0075800 A1* | 3/2021 | Paraskevas ......... H04L 63/1441 |
| 2022/0055637 A1 | 2/2022 | Katayama et al. |

FOREIGN PATENT DOCUMENTS

| | | |
|---|---|---|
| JP | 5446167 | 3/2014 |
| JP | 2015-528171 | 9/2015 |
| WO | 2014/012464 | 1/2014 |
| WO | 2020/261519 | 12/2020 |

OTHER PUBLICATIONS

International Search Report (ISR) from International Searching Authority (Japan Patent Office) in International Pat. Appl. No. PCT/JP2021/045969, dated Mar. 15, 2022, together with an English language translation.

* cited by examiner

FIG. 3

| | Stopped (Ignition OFF) | Temporarily stopped (Ignition ON) | Manual driving | Autonomous driving |
|---|---|---|---|---|
| Application A (charging management) | L | — | — | — |
| Application B (remote starting) | L | L | L | L |
| Application C (trunk-sharing) | L | L | L | H |
| Application D (automatic ride-hailing) | L | L | L | H |
| Application E (car-sharing) | L | L | L | H |
| Application F (vehicle exterior control) | H | H | H | H |
| Application G (vehicle interior control) | H | H | H | H |
| Application H (automatic valet parking) | L | L | — | H |

L: Influence on vehicle is low
H: Influence on vehicle is high

FIG. 4

|  | | Application A, B | Application C, D, E | Application F, G | Application H |
|---|---|---|---|---|---|
| Response A | (increased monitoring frequency/follow-up monitoring) | Can be executed regardless of degree of influence | Can be executed regardless of degree of influence | Can be executed regardless of degree of influence | Can be executed regardless of degree of influence |
| Response B | (integrity check) | Identify if attack has occurred and determine once again | Identify if attack has occurred and determine once again | Identify if attack has occurred and determine once again | Identify if attack has occurred and determine once again |
| Response C | (prohibiting API use) | Can be executed once user has been notified | Can be executed depending on the situation | Can be executed once user has been notified | Can be executed except during autonomous driving |
| Response D | (stopping, deleting application) | Can be executed once user has been notified | Can be executed except during autonomous driving | Can be executed depending on the situation | Can be executed except during autonomous driving |
| Recovery A | (rebooting application) | Can be executed once user has been notified | Can be executed depending on the situation | Can be executed once user has been notified | Can be executed except during autonomous driving |
| Recovery B | (overwriting with repaired (clean) application) | Can be executed once user has been notified | Can be executed except during autonomous driving | Can be executed depending on the situation | Can be executed except during autonomous driving |
| Recovery C | (rebooting virtual machine) | Can be executed depending on the situation | Can be executed depending on the situation | Can be executed depending on the situation | Can be executed depending on the situation |
| Recovery D | (rebooting CPU) | Can be executed depending on the situation | Can be executed depending on the situation | Can be executed depending on the situation | Can be executed depending on the situation |

VEHICLE CONTROL SYSTEM AND METHOD FOR CONTROLLING VEHICLE CONTROL SYSTEM

CROSS REFERENCE TO RELATED APPLICATIONS

This is a continuation application of PCT International Application No. PCT/JP2021/045969 filed on Dec. 14, 2021, designating the United States of America, which is based on and claims priority of Japanese Patent Application No. 2021-018087 filed on Feb. 8, 2021.

FIELD

The present disclosure relates to a vehicle control system and a method for controlling the vehicle control system.

BACKGROUND

For example, for a mobility service, such as mobility as a service (MaaS), an application execution environment for running an application for the mobility service is provided in a vehicle.

For such a mobility service, there is a demand for security technology to handle cases of unauthorized access to the application (see Patent Literature (PTL) 1, for example).

CITATION LIST

Patent Literature

PTL 1: Japanese Patent No. 4256107

SUMMARY

However, the above-mentioned conventional security technology can be improved upon.

In view of this, the present disclosure provides a vehicle control system and a method for controlling the vehicle control system that are capable of improving upon the related art.

A vehicle control system according to one aspect of the present disclosure is a vehicle control system provided in a vehicle that includes an application execution environment for operating an application, and the vehicle control system includes: a detector that detects an attack on the application; a vehicle state verifier that verifies a state of the vehicle when the detector detects the attack; an influence verifier that verifies, based on a verification result of the vehicle state verifier, an influence on the vehicle assuming operation of the application subjected to the attack is stopped; a determiner that determines, based on a verification result of the influence verifier, at least one of a response method for responding to the attack or a recovery method for recovering the application subjected to the attack; and a controller that executes at least one of the response method or the recovery method determined.

It should be noted that these generic and specific aspects may be implemented as a system, a method, an integrated circuit, a computer program, or a computer-readable recording medium, such as a compact disc-read only memory (CD-ROM), or may be implemented as any combination of a system, a method, an integrated circuit, a computer program, and a recording medium.

The vehicle control system according to one aspect of the present disclosure is capable of improving upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a diagram illustrating an example of a first management table according to the embodiment.

FIG. 4 is a diagram illustrating an example of a second management table according to the embodiment.

Figure 1:
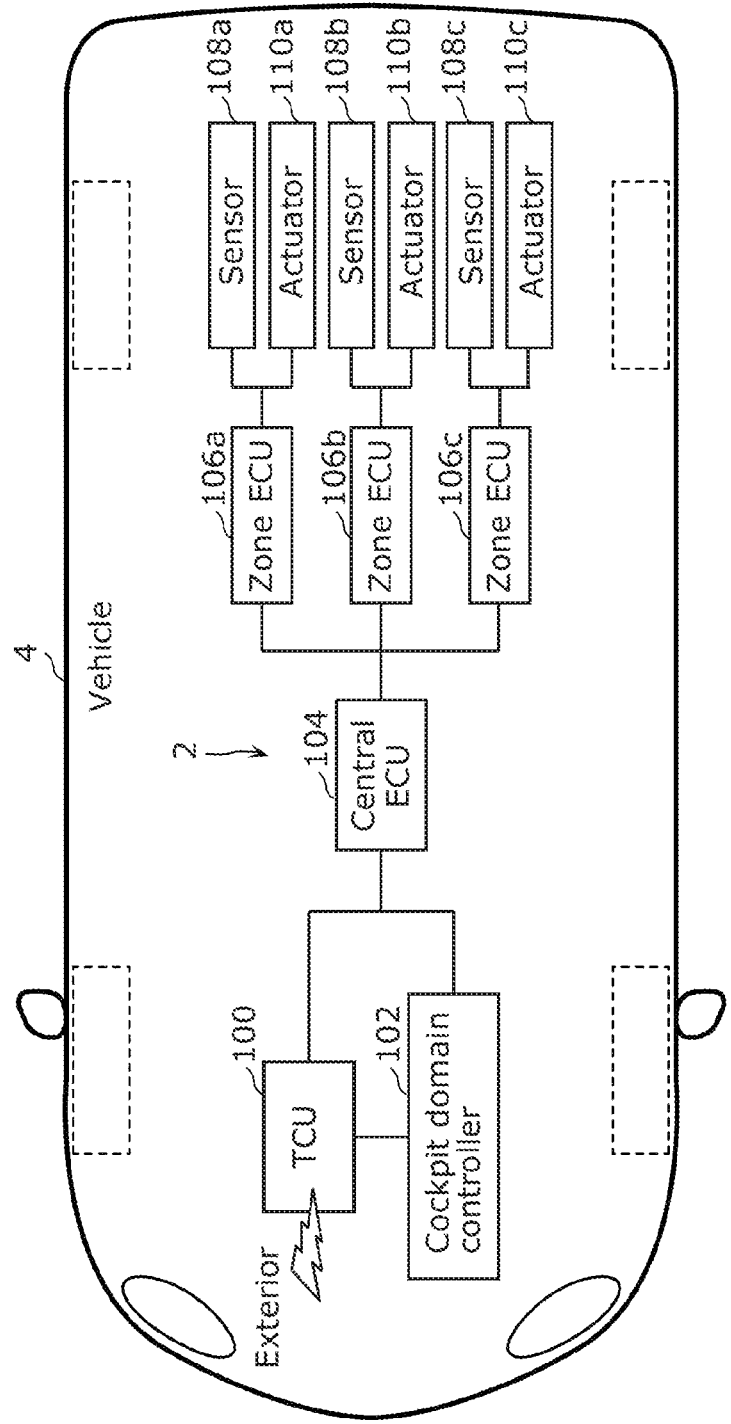
FIG. 1 is a diagram illustrating an outline of a vehicle control system according to an embodiment.

DESCRIPTION OF EMBODIMENT (Underlying Knowledge Forming Basis of the Present Disclosure)

In relation to the security technology described in the "Background" section, the inventors have found the following problem. Specifically, there is a problem that vehicle safety is not necessarily ensured for the above-mentioned conventional security technology.

In order to overcome such a problem, a vehicle control system according to one aspect of the present disclosure is a vehicle control system provided in a vehicle that includes an application execution environment for operating an application. The vehicle control system includes: a detector that detects an attack on the application; a vehicle state verifier that verifies a state of the vehicle when the detector detects the attack; an influence verifier that verifies, based on a verification result of the vehicle state verifier, an influence on the vehicle assuming operation of the application subjected to the attack is stopped; a determiner that determines, based on a verification result of the influence verifier, at least one of a response method for responding to the attack or a recovery method for recovering the application subjected to the attack; and a controller that executes at least one of the response method or the recovery method determined.

According to this aspect, the influence verifier verifies, in accordance with the state of the vehicle, the influence on the vehicle assuming operation of the application subjected to the attack is stopped. Subsequently, the determiner determines, based on the verification result of the influence verifier, at least one of a response method for responding to the attack or a recovery method for recovering the application subjected to the attack. As a result, since at least one of the response method or the recovery method that have been determined with consideration to the state of the vehicle is executed, security measures can be implemented while ensuring vehicle safety.

For example, the vehicle control system may further include a recovery readiness state verifier that verifies a recovery readiness state of the application subjected to the attack, and the controller may execute the recovery method on a condition that preparations for recovering the application subjected to the attack are complete, based on a verification result of the recovery readiness state verifier.

According to this aspect, the recovery method can be reliably executed in a state where preparations for recovering the application subjected to the attack have already been completed.

For example, the vehicle control system may further include a vulnerability level verifier that verifies a vulnerability level of the application subjected to the attack, and when the vulnerability level of the application is greater than or equal to a threshold value, the influence verifier may verify the influence on the vehicle assuming the operation of the application subjected to the attack is stopped.

According to this aspect, needless execution of at least one of the response method or the recovery method can be avoided when the vulnerability level of the application is relatively low.

For example, the application execution environment may be configured to operate a plurality of applications each of which is the application, and when a sum of respective vulnerability levels of the plurality of applications exceeds a predetermined value, or when a total number of the plurality of applications for which execution of the response method has failed exceeds a predetermined number, the controller may execute the response method on all of the plurality of applications, or may switch from executing the response method to executing the recovery method.

According to this aspect, at least one of the response method or the recovery method can be effectively executed when a plurality of applications are subjected to attack.

For example, the response method may be any one of follow-up monitoring of the application under an increased frequency of monitoring, checking integrity of the application, stopping operation of the application, deleting the application, or prohibiting use of an application programming interface (API) of the application.

According to this aspect, the response method can be effectively executed.

For example, the recovery method may be any one of overwriting the application with a repaired application, rebooting the application, or rebooting the application execution environment.

According to this aspect, the recovery method can be effectively executed.

A method for controlling a vehicle control system according to one aspect of the present disclosure is a method for controlling a vehicle control system provided in a vehicle that includes an application execution environment for operating an application. The method includes: (a) detecting an attack on the application; (b) verifying a state of the vehicle when the attack is detected; (c) verifying, based on a verification result in (b), an influence on the vehicle assuming operation of the application is stopped; (d) determining, based on a verification result in (c), at least one of a response method for responding to the attack or a recovery method for recovering the application; and (e) executing at least one of the response method or the recovery method determined.

According to this aspect, the influence on the vehicle assuming operation of the application subjected to the attack is stopped is verified in accordance with the state of the vehicle. Subsequently, at least one of the response method for the attack or the recovery method for the application subjected to the attack is determined based on the verification result. As a result, since at least one of the response method or the recovery method that have been determined with consideration to the state of the vehicle is executed, security measures can be implemented while ensuring vehicle safety.

It should be noted that these generic and specific aspects may be implemented as a system, a method, an integrated circuit, a computer program, or a computer-readable recording medium, such as a CD-ROM, or may be implemented as any combination of a system, a method, an integrated circuit, a computer program, and a recording medium.

Hereinafter, embodiments will be described in detail with reference to the drawings.

It should be noted that the embodiments described below merely illustrate generic or specific examples of the present disclosure. The numerical values, shapes, materials, elements, the arrangement and connection states of the elements, steps, the order of the steps, etc., described in the following embodiments are mere examples, and are therefore not intended to limit the present disclosure. Accordingly, among elements in the following embodiments, those not appearing in any of the independent claims that indicate the broadest concepts of the present disclosure will be described as optional elements.

Embodiment

[1. Vehicle Control System Configuration]

Figure 2:
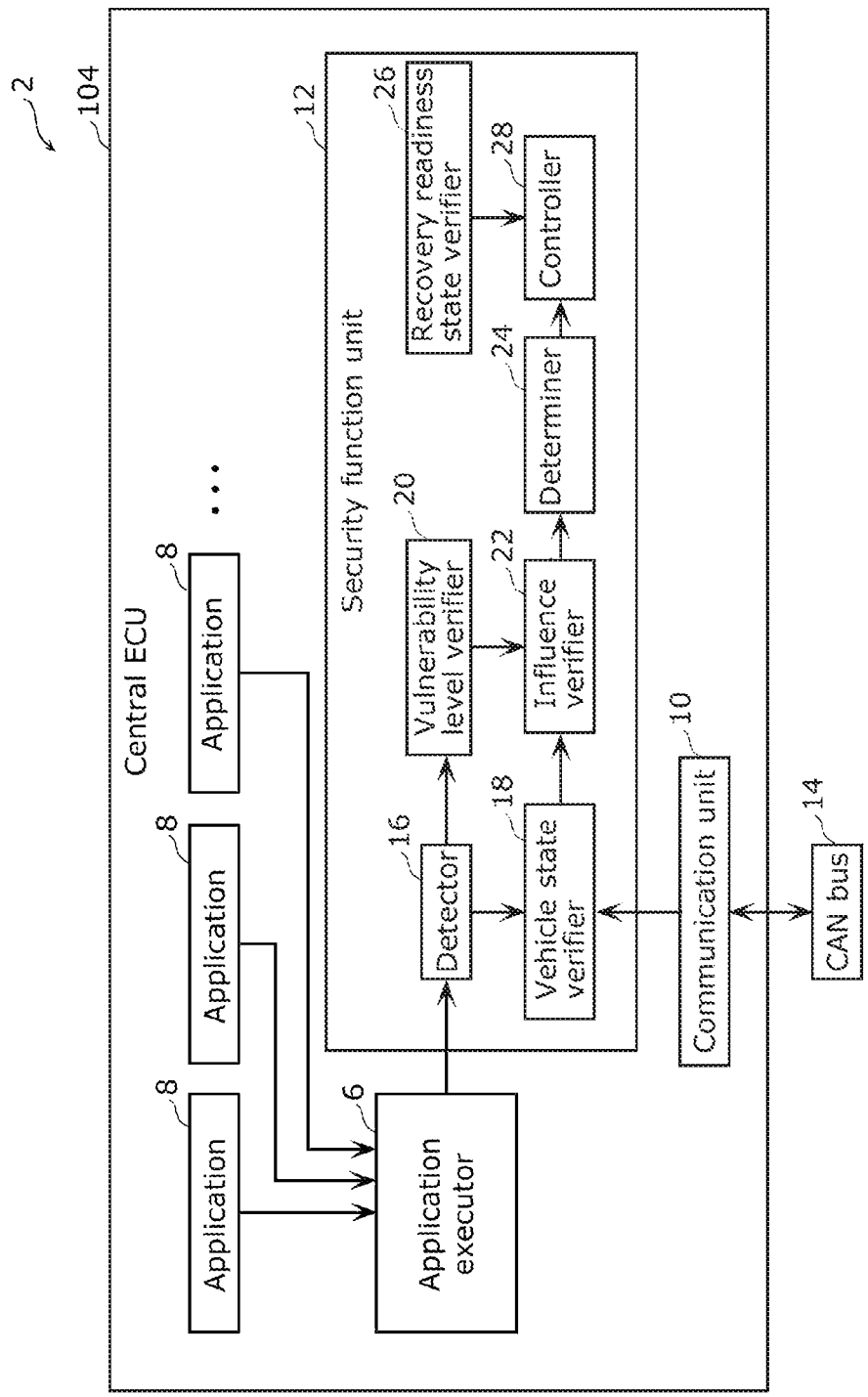
FIG. 2 is a block diagram of a functional configuration of the vehicle control system according to the embodiment.

First, a configuration of vehicle control system 2 according to an embodiment will be described with reference to FIG. 1 to FIG. 4. FIG. 1 is a diagram illustrating an outline of vehicle control system 2 according to the embodiment. FIG. 2 is a block diagram of a functional configuration of vehicle control system 2 according to the embodiment. FIG. 3 is a diagram illustrating an example of a first management table according to the embodiment. FIG. 4 is a diagram illustrating an example of a second management table according to the embodiment.

Vehicle control system 2 according to the embodiment is applied to an autonomous driving system that is provided in vehicle 4, which is an automobile or the like, and performs control so that driving operations of vehicle 4, such as acceleration, deceleration, steering, and braking, are autonomously performed by an advanced driver assistance system (ADAS).

As shown in FIG. 1, vehicle 4 includes telematics control unit (TCU) 100, cockpit domain controller 102, central electronic control unit (ECU) 104, zone ECUs 106*a*, 106*b*, and 106*c*, sensors 108*a*, 108*b*, and 108*c*, and actuators 110*a*, 110*b*, and 110*c*. It should be noted that these elements are connected to each other via a controller area network (CAN) bus, for example.

TCU 100 is a communication module that can connect to a communication network, such as the Internet. That is to say, TCU 100 can communicate with the outside. For example, TCU 100 downloads, via a communication network, an application from a third party other than the automobile manufacturer, car dealership, and users of vehicle 4. TCU 100 outputs the downloaded application to central ECU 104.

Cockpit domain controller 102 controls, for example, an in-vehicle infotainment (IVI) unit, digital cluster, and head-up display in an integrated manner. Note that, the digital cluster is a unit panel that consolidates various meters necessary for the operation of vehicle 4.

Central ECU 104 controls zone ECUs 106*a* to 106*c*. In the present embodiment, central ECU 104 is one example of vehicle control system 2 provided in vehicle 4.

Zone ECU 106*a* drives mechanisms in a region in vehicle 4 allocated to zone ECU 106*a*, by controlling actuator 110*a* according to the sensing result of sensor 108*a* and instructions from central ECU 104. These mechanisms may, for example, be a front wheel or a rear wheel of vehicle 4, and may be window, door, or trunk opening and closing mechanisms, or the like.

In the same manner, zone ECU 106b drives mechanisms in a region in vehicle 4 allocated to zone ECU 106b, by controlling actuator 110b according to the sensing result of sensor 108b and instructions from central ECU 104. These mechanisms may, for example, be a front wheel or a rear wheel of vehicle 4, and may be window, door, or trunk opening and closing mechanisms, or the like.

In the same manner, zone ECU 106c drives mechanisms in a region in vehicle 4 allocated to zone ECU 106c, by controlling actuator 110c according to the sensing result of sensor 108c and instructions from central ECU 104. These mechanisms may, for example, be a front wheel or a rear wheel of vehicle 4, and may be window, door, or trunk opening and closing mechanisms, or the like.

As shown in FIG. 2, central ECU 104 is configured as a system on a chip (SoC), and includes application executor 6, communication unit 10, and security function unit 12. It should be noted that application executor 6, communication unit 10, and security function unit 12 are implemented by central ECU 104 executing a software program. Note that central ECU 104 may include a single or multiple central processing units (CPUs).

Furthermore, a plurality of applications 8 that run on application executor 6 are provided to central ECU 104. Each of the plurality of applications 8 is, for example, an application for a mobility service provided by a third party.

Specifically, the plurality of applications 8 include a) an application for managing battery charging of vehicle 4 (hereinafter referred to as "application A"), b) an application for remote starting to remotely start an engine in vehicle 4 (hereinafter referred to as "application B"), c) an application for trunk-sharing to use the trunk (luggage compartment) of vehicle 4 as a place for handing off luggage (hereinafter referred to as "application C"), d) an application for automatic ride-hailing for vehicle 4 (hereinafter referred to as "application D"), e) an application for car-sharing to allow multiple users to share and use a single vehicle 4 (hereinafter referred to as "application E"), f) an application for controlling equipment on the outside of vehicle 4 (e.g., headlights, windshield wipers, and the like) (hereinafter referred to as "application F"), g) an application for controlling equipment on the inside of vehicle 4 (e.g., cabin lamps, door locks, and the like) (hereinafter referred to as "application G"), h) an application for automated valet parking to automatically park vehicle 4 in an empty space in a parking lot (hereinafter referred to as "application H"), and the like.

Application executor 6 is one example of an application execution environment that runs each of the plurality of applications 8. Application executor 6 is, for example, a virtual machine that runs on a hypervisor, and functions as a mobility service platform. It should be noted that in addition to virtual machines for mobility service platforms as described above, other virtual machines that run on a hypervisor include, for example, virtual machines for ADAS, and the like.

Communication unit 10 is connected to CAN bus 14 that is a mobility network included in vehicle 4, and communication unit 10 receives vehicle state information indicating the state of vehicle 4 from CAN bus 14. Vehicle state information is information that is detected by the various sensors included in vehicle 4, and indicates, for example, that the vehicle is being driven, stopped, idling, whether the trunk is open or closed, whether a door is open or closed, the presence of obstacles in the vicinity, driving speed, the state of the vehicle interior, and the like.

Security function unit 12 includes detector 16, vehicle state verifier 18, vulnerability level verifier 20, influence verifier 22, determiner 24, recovery readiness state verifier 26, and controller 28.

Detector 16 detects an attack on each of the plurality of applications 8 (for example, such as to take over control of application 8) that runs on application executor 6. Specifically, detector 16 detects the behavior (actions) of each of the plurality of applications 8 that runs on application executor 6, and detects an attack on each of the plurality of applications 8 by comparing the behavior detected to normal behavior that has been registered in advance. Alternatively, detector 16 may detect an attack on each of the plurality of applications 8 by pattern matching to determine if there is a match with a signature of malware. Detector 16 outputs the detection result to vehicle state verifier 18 and vulnerability level verifier 20.

When detector 16 detects an attack, vehicle state verifier 18 verifies the state of vehicle 4 by obtaining vehicle state information from communication unit 10. Vehicle state verifier 18 outputs the verification result to influence verifier 22.

When detector 16 detects an attack, vulnerability level verifier 20 verifies, based on the detection result of detector 16, the vulnerability level of the application 8 subjected to the attack. The vulnerability level is an index indicating the degree of vulnerability of the application 8 subjected to the attack, and is represented on a three-level scale, as level 1 (attacked but no probability of intrusion), level 2 (probability of intrusion), and level 3 (high probability of intrusion). In this case, the vulnerability level increases in ascending order from level 1 to level 2 to level 3. Vulnerability level verifier 20 outputs the verification result to influence verifier 22.

When the vulnerability level of application 8 is level 2 or higher (one example of a threshold), influence verifier 22 verifies, based on the verification result of vehicle state verifier 18, the influence on vehicle 4 assuming operation of the application 8 subjected to the attack is stopped.

Specifically, influence verifier 22 verifies the influence on vehicle 4 assuming operation of the application 8 subjected to the attack is stopped, by referencing, for example, the first management table shown in FIG. 3. The first management table shown in FIG. 3 is a table indicating the degree of influence on vehicle 4 for each state of vehicle 4 (stopped, temporarily stopped, manual driving, autonomous driving) if operation of each application 8 (application A to H) was to be stopped.

It should be noted that "stopped" refers to a state where vehicle 4 is stopped with the ignition of vehicle 4 being off. Furthermore, it should be noted that "temporarily stopped" refers to a state where vehicle 4 is stopped with the ignition of vehicle 4 being on. Additionally, "manual driving" refers to a state where the driving operations of vehicle 4 are being manually performed by a user. Moreover, "autonomous driving" refers to a state where the driving operations of vehicle 4 are being autonomously performed by ADAS.

For example, when the state of vehicle 4 verified by vehicle state verifier 18 is "stopped" and the application 8 subjected to the attack is "application B", influence verifier 22 verifies that the influence on vehicle 4 assuming operation of application B is stopped when vehicle 4 is stopped is "L (influence on vehicle 4 is low)", by referencing the first management table shown in FIG. 3.

Furthermore, for example, when the state of vehicle 4 verified by vehicle state verifier 18 is "autonomous driving" and the application 8 subjected to the attack is "application C", influence verifier 22 verifies that the influence on vehicle 4 assuming operation of application C is stopped when vehicle 4 is being autonomously driven is "H (influence on vehicle 4 is high)", by referencing the first management table shown in FIG. 3.

Determiner 24 determines, based on the verification result of influence verifier 22, the response method for the attack and the recovery method for application 8.

Response methods include, for example, a) follow-up monitoring of application 8 under increased frequency of monitoring (hereinafter referred to as "response A"), b) checking the integrity of application 8 (hereinafter referred to as "response B"), c) prohibiting use of an application programming interface (API) of application 8 (hereinafter referred to as "response C"), d) stopping operation of or deleting application 8 (hereinafter referred to as "response D"), and the like.

Recovery methods include, for example a) rebooting application 8 (hereinafter referred to as "recovery A"), b) overwriting with a repaired (clean) application (hereinafter referred to as "recovery B"), c) rebooting the virtual machine included in the application execution environment (hereinafter referred to as "recovery C"), d) rebooting the central processing unit (CPU) included in vehicle control system 2 (hereinafter referred to as "recovery D"), and the like.

Specifically, determiner 24 determines, based on the verification result of influence verifier 22, the response method for the attack and the recovery method for the application, by referencing, for example, the second management table shown in FIG. 4. The second management table shown in FIG. 4 is a table indicating the response method (response A to D) and the recovery method (recovery A to D) corresponding to the degree of influence on vehicle 4 for each application 8 (application A to H).

It should be noted that the degree of influence on vehicle 4 corresponding to the response method increases in ascending order from response A to response B to response C to response D. That is to say, when the influence on vehicle 4 is relatively low, determiner 24 determines response A (or response B) to be the response method by referencing the second management table. Furthermore, when the influence on vehicle 4 is relatively high, determiner 24 determines response C (or response D) to be the response method by referencing the second management table.

Additionally, the degree of influence on vehicle 4 corresponding to the recovery method increases in ascending order from recovery A to recovery B to recovery C to recovery D. That is to say, when the influence on vehicle 4 is relatively low, determiner 24 determines recovery A (or recovery B) to be the recovery method by referencing the second management table. Moreover, when the influence on vehicle 4 is relatively high, determiner 24 determines recovery C (or recovery D) to be the recovery method by referencing the second management table.

For example, when the application 8 subjected to the attack is "application B" and the influence on vehicle 4 verified by influence verifier 22 is "L (influence on vehicle 4 is low)", determiner 24 determines response A (or response B) to be the response method and determines recovery A (or recovery B) to be the recovery method by referencing the second management table shown in FIG. 4.

Furthermore, for example, when the application 8 subjected to the attack is "application F" and the influence on vehicle 4 verified by influence verifier 22 is "H (influence on vehicle 4 is high)", determiner 24 determines response C (or response D) to be the response method and determines recovery C (or recovery D) to be the recovery method by referencing the second management table shown in FIG. 4.

When the response method and the recovery method are determined by determiner 24, recovery readiness state verifier 26 verifies the recovery readiness state of application 8. The recovery readiness state is indicated by, for example, a) whether external notification (e.g., virtual machine, monitoring ECU, external server, user, or the like) is complete, b) whether logging is complete, c) whether data backup is complete, d) whether downloading of a repaired (clean) application is complete, and the like. Recovery readiness state verifier 26 outputs the verification result to controller 28.

Controller 28 executes the response method determined by determiner 24. Furthermore, on the condition that preparations for recovering application 8 are complete, based on the verification result of recovery readiness state verifier 26, controller 28 executes the recovery method determined by determiner 24.

[2. Vehicle Control System Operation]

Figure 5:
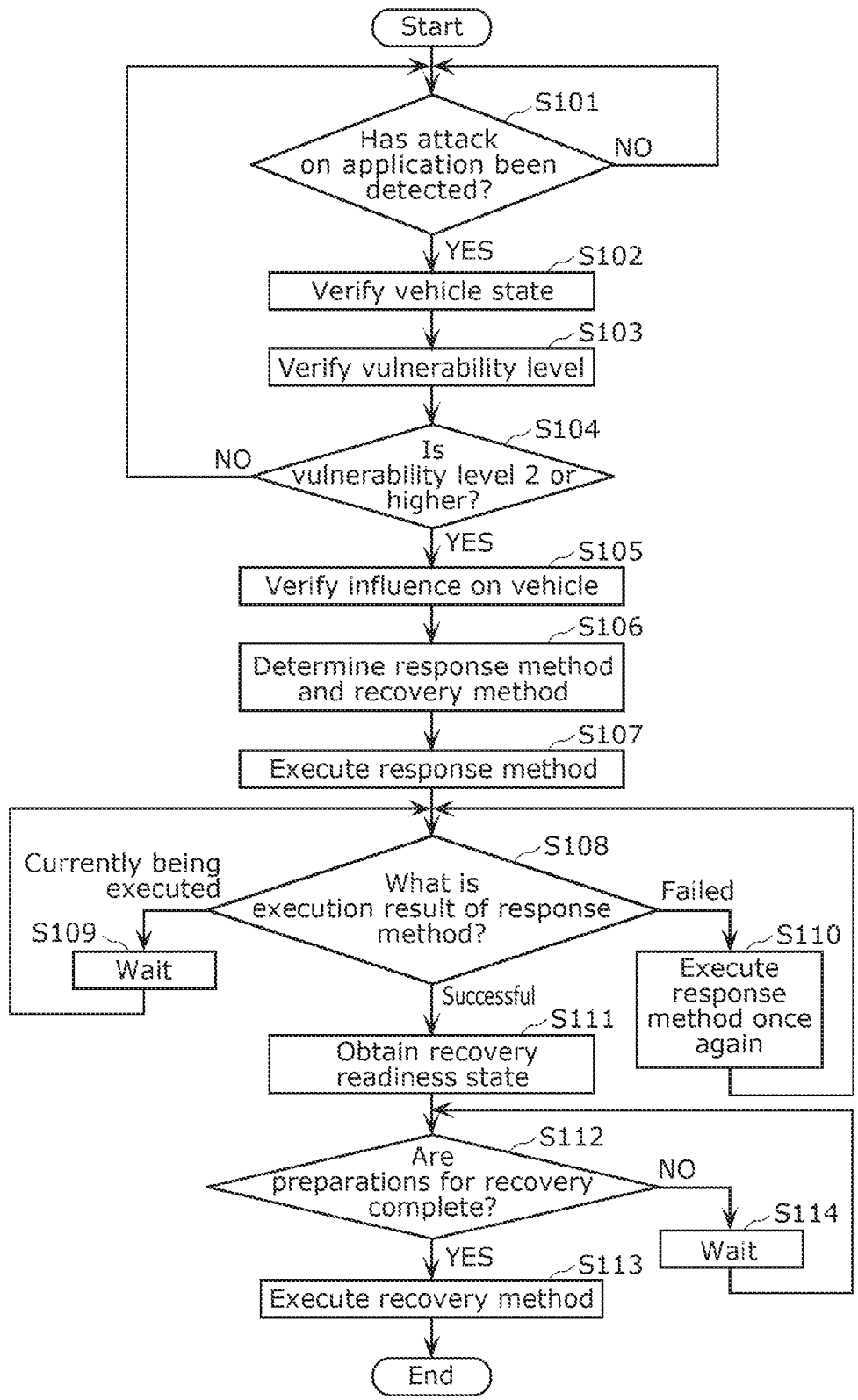
FIG. 5 is a flowchart illustrating the flow of operation of the vehicle control system according to the embodiment.

Next, the operation of vehicle control system 2 according to the embodiment will be described with reference to FIG. 5. FIG. 5 is a flowchart illustrating the flow of operation of vehicle control system 2 according to the embodiment.

As shown in FIG. 5, when detector 16 detects an attack on application 8 ("YES" in S101), vehicle state verifier 18 verifies the state of vehicle 4 by obtaining vehicle state information from communication unit 10 (S102). Furthermore, when detector 16 does not detect an attack on application 8 ("NO" in S101), step S101 is repeatedly performed.

After step S102, vulnerability level verifier 20 verifies, based on the detection result of detector 16, the vulnerability level of the application 8 subjected to the attack (S103). When the vulnerability level of application 8 is level 2 or higher ("YES" in S104), influence verifier 22 verifies, based on the verification result of vehicle state verifier 18, the influence on vehicle 4 assuming operation of the application 8 subjected to the attack is stopped (S105). Furthermore, when the vulnerability level of application 8 is less than level 2 ("NO" in S104), the process returns to step S101.

After step S105, determiner 24 determines, based on the verification result of influence verifier 22, the response method for the attack and the recovery method for application 8 (S106). Controller 28 executes the response method determined by determiner 24 (S107).

When the execution result of the response method is "currently being executed" ("Currently being executed" in S108), determiner 24 waits until execution of the response method is complete (S109), and the process returns to step S108.

When the execution result of the response method is "failed" ("Failed" in S108), determiner 24 once again attempts to execute the response method (S110), and the process returns to step S108.

When the execution result of the response method is "successful" ("Successful" in S108), controller 28 obtains the recovery readiness state of application 8 from recovery readiness state verifier 26 (S111). When preparations for recovering application 8 are complete ("YES" in S112), controller 28 executes the recovery method determined by determiner 24 (S113).

When preparations for recovering application 8 are not complete ("NO" in S112), controller 28 waits until preparations for recovering application 8 are complete (S114), and the process returns to step S112.

[3. Advantageous Effects]

In the present embodiment, influence verifier 22 verifies, in accordance with the state of vehicle 4, the influence on vehicle 4 assuming operation of the application 8 subjected to the attack is stopped. Subsequently, determiner 24 determines, based on the verification result of influence verifier 22, the response method for the attack and the recovery method for the application 8 subjected to the attack.

As a result, since a response method and a recovery method that have been determined with consideration to the state of vehicle 4 are executed, security measures can be implemented while ensuring the safety of vehicle 4.

Variations, Etc.

While a vehicle control system and a method for controlling the vehicle control system according to one or more aspects have been described based on the above-mentioned embodiment, the present disclosure is not limited to the above-mentioned embodiment. Forms obtained by various modifications to the foregoing embodiment conceivable by those skilled in the art or forms obtained by combining elements in different embodiments, so long as they do not depart from the essence of the present disclosure, may be included in the one or more aspects.

While determiner 24 determines both the response method for the attack and the recovery method for the application in the above-mentioned embodiment, determiner 24 is not limited to this, and may determine only the response method or the recovery method. In such a case, controller 28 may execute only the response method or the recovery method determined.

Furthermore, in the above-mentioned embodiment, while controller 28 executes the response method and the recovery method determined, in a case where a plurality of applications 8 are subjected to attack, for example, they may be executed as follows. Specifically, when the sum of the respective vulnerability levels of the plurality of applications 8 subjected to attack exceeds a predetermined value or the total number of applications 8 for which the execution of a response method has failed exceeds a predetermined number, controller 28 may execute the response method on all of the plurality of applications 8 subjected to attack. Alternatively, when the sum of the respective vulnerability levels of the plurality of applications 8 subjected to attack exceeds a predetermined value or the total number of applications 8 for which the execution of a response method has failed exceeds a predetermined number, controller 28 may switch from executing a response method to executing a recovery method. Furthermore, when calculating the sum of the respective vulnerability levels of the plurality of applications 8 subjected to attack, weights may be assigned in accordance with the degree of influence that each application 8 has on a behavior of vehicle 4 (driving, turning, stopping).

Additionally, when the attack on application 8 is a denial-of-service (DoS) attack, or the like, the amount of CPU resources allocated and the priority given to application 8 may be lowered as a response method.

Moreover, when overwriting with a repaired (clean) application as a recovery method, since downloading the repaired application takes time, the application may be restored if a backup of the repaired application is available.

In the above-mentioned embodiment, each element may be configured as dedicated hardware, or may be implemented by executing a software program suitable for each element. Alternatively, the elements may be implemented by a program executor, such as a CPU or a processor, reading and executing a software program recorded in a recording medium, such as a hard disk or semiconductor memory.

Furthermore, a portion or all of the functions of the vehicle control system according to the above-mentioned embodiment may be implemented by a processor, such as a CPU, executing a program.

A portion or all of the elements included in the preceding devices may be configured as an IC card or stand-alone module that can be inserted and removed from the corresponding device. The IC card or the module is a computer system that includes a microprocessor, ROM, RAM, and the like. The IC card or the module may include the super-multifunctional LSI described above. The microprocessor operates according to the computer program, so that a function of the IC card or the module is achieved. The IC card or the module may be tamper-resistant.

The present disclosure may be the method described above. Furthermore, the present disclosure may be a computer program for causing a computer to execute the method, or may be a digital signal of the computer program. Additionally, the present disclosure may be the above-mentioned computer program or the digital signal recorded on a non-transitory, computer-readable recording medium, such as a flexible disk, hard disk, CD-ROM, MO, DVD, DVD-ROM, DVD-RAM, BD (Blu-ray (registered trademark) Disc), or semiconductor memory. Moreover, the present disclosure may be the digital signal recorded on the above-mentioned recording media. Furthermore, the present disclosure may be the above-mentioned computer program or the digital signal transmitted via an electric communication line, a wireless or wired communication line, a network, such as the Internet, data broadcasting, and the like. Additionally, the present disclosure may be a computer system including a microprocessor and memory. The memory may store the above-mentioned computer program, and the microprocessor may operate according to the computer program. Moreover, by transferring the recording medium having the above-mentioned program or digital signal recorded thereon or by transferring the above-mentioned program or digital signal via the above-mentioned network or the like, the present disclosure may be implemented by a different independent computer system.

Further Information about Technical Background to this Application

The disclosures of the following patent applications including specification, drawings, and claims are incorporated herein by reference in their entirety: Japanese Patent Application No. 2021-018087 filed on Feb. 8, 2021, and PCT International Application No. PCT/JP2021/045969 filed on Dec. 14, 2021, designating the United States of America.

INDUSTRIAL APPLICABILITY

The vehicle control system according to the present disclosure can be applied to an autonomous driving system, and the like, included in a vehicle, for example.

The invention claimed is:

1. A vehicle control system provided in a vehicle that includes an application execution environment for operating an application, the vehicle control system comprising:
   a detector that detects an attack on the application;
   a vehicle state verifier that verifies a state of the vehicle when the detector detects the attack;

an influence verifier that verifies, based on a first verification result of the vehicle state verifier, an influence on the vehicle assuming operation of the application subjected to the attack is stopped;

a determiner that determines, based on a second verification result of the influence verifier, at least one of a response method for responding to the attack or a recovery method for recovering the application subjected to the attack;

a controller that executes the at least one of the response method or the recovery method determined; and a recovery readiness state verifier that verifies a recovery readiness state of the application subjected to the attack, wherein the controller executes the recovery method on a condition that preparations for recovering the application subjected to the attack are complete, based on a third verification result of the recovery readiness state verifier.

2. The vehicle control system according to claim 1, further comprising:

a vulnerability level verifier that verifies a vulnerability level of the application subjected to the attack, wherein when the vulnerability level of the application is greater than or equal to a threshold value, the influence verifier verifies the influence on the vehicle assuming the operation of the application subjected to the attack is stopped.

3. The vehicle control system according to claim 2, wherein the application execution environment is configured to operate a plurality of applications each of which is the application, and when a sum of respective vulnerability levels of the plurality of applications exceeds a predetermined value, or when a total number of the plurality of applications for which execution of the response method has failed exceeds a predetermined number, the controller executes the response method on all of the plurality of applications, or the controller switches from executing the response method to executing the recovery method.

4. The vehicle control system according to claim 1, wherein the response method is any one of follow-up monitoring of the application under an increased frequency of monitoring, checking integrity of the application, stopping operation of the application, deleting the application, or prohibiting use of an application programming interface (API) of the application.

5. The vehicle control system according to claim 1, wherein the recovery method is any one of overwriting the application with a repaired application, rebooting the application, or rebooting the application execution environment.

6. A method for controlling a vehicle control system provided in a vehicle that includes an application execution environment for operating an application, the method comprising:

(a) detecting an attack on the application;

(b) verifying a state of the vehicle when the attack is detected;

(c) verifying, based on a first verification result in (b), an influence on the vehicle assuming operation of the application is stopped;

(d) determining, based on a second verification result in (c), at least one of a response method for responding to the attack or a recovery method for recovering the application;

(e) executing at least one of the response method or the recovery method determined;

(f) verifying a recovery readiness state of the application subjected to the attack, wherein the recovery method is executed in (e) on a condition that preparations for recovering the application subjected to the attack are complete, based on a third verification result in (f).

7. A vehicle control system provided in a vehicle that includes an application execution environment for operating an application, the vehicle control system comprising:

a detector that detects an attack on the application;

a vehicle state verifier that verifies a state of the vehicle when the detector detects the attack;

an influence verifier that verifies, based on a first verification result of the vehicle state verifier, an influence on the vehicle assuming operation of the application subjected to the attack is stopped;

a determiner that determines, based on a second verification result of the influence verifier, at least one of a response method for responding to the attack or a recovery method for recovering the application subjected to the attack;

a controller that executes the at least one of the response method or the recovery method determined;

a vulnerability level verifier that verifies a vulnerability level of the application subjected to the attack, wherein when the vulnerability level of the application is greater than or equal to a threshold value, the influence verifier verifies the influence on the vehicle assuming the operation of the application subjected to the attack is stopped.

* * * * *